United States Patent
Cho et al.

(10) Patent No.: US 8,713,233 B2
(45) Date of Patent: Apr. 29, 2014

(54) INTERCONNECT, BUS SYSTEM WITH INTERCONNECT AND BUS SYSTEM OPERATING METHOD

(75) Inventors: Joon-Woo Cho, Seoul (KR); Jong Ho Roh, Yongin-si (KR); Jae Geun Yun, Hwaseong-si (KR); Sung-Min Hong, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 371 days.

(21) Appl. No.: 13/050,405

(22) Filed: Mar. 17, 2011

(65) Prior Publication Data

US 2011/0276735 A1 Nov. 10, 2011

(30) Foreign Application Priority Data

May 4, 2010 (KR) .......................... 10-2010-0042071

(51) Int. Cl.
*G06F 13/00* (2006.01)
(52) U.S. Cl.
USPC ............................ 710/110; 710/240; 710/305

(58) Field of Classification Search
USPC ................... 710/110, 22, 113, 305, 240–244, 710/316–317
See application file for complete search history.

(56) References Cited

U.S. PATENT DOCUMENTS

| 6,473,339 B2 | 10/2002 | De Ambroggi et al. |
| 7,984,202 B2 * | 7/2011 | Hofmann et al. ............... 710/22 |

FOREIGN PATENT DOCUMENTS

| JP | 2000330865 A | 11/2000 |
| KR | 1020050027923 A | 3/2005 |
| KR | 1020050097212 A | 10/2005 |

* cited by examiner

*Primary Examiner* — Ryan Stiglic
*Assistant Examiner* — Kim Huynh
(74) *Attorney, Agent, or Firm* — Volentine & Whitt, PLLC (57) ABSTRACT

Provided are an interconnect, a bus system with interconnect, and bus system operating method. The bus system includes a master, slaves access by the master, and an interconnect. The interconnect connects the master with the slaves in response to selection bits identified in a master address provided by the master.

14 Claims, 7 Drawing Sheets

| MADDR[31:0] | SADDR1[30:0]/SADDR2[30:0] | Selected Memory |
|---|---|---|
| 0101010101000101010001010101010101 | 010101010100010101000101010101011 | Memory1 |
| 11111111110000000011111111111111 | 1111111110000000001111111111111 | Memory2 |
| 00000000000011111011010101010000000000 | 0000000000111110110101010100000000000 | Memory1 |
| 1010101010111101011 1010101010 | 101010101011110101 1010101010 | Memory2 |

| MADDR[31:0] | SADDR1[29:0]/SADDR2[29:0] | Selected Memory |
|---|---|---|
| 0101010101000101010001010101010101 | 01010101010001010100010101010101 | Memory1 |
| 11111111110000000011111111111111 | 111111110000000001111111111111 | Memory2 |
| 00000000000011111011010101010000000000 | 00000000001111101101010101000000000 | Memory2 |
| 1010101010111101011 1010101010 | 10101010111101011 1010101010 | Memory1 |

| MADDR[31:0] | SADDR1[29:0]/SADDR2[29:0] | Selected Memory |
|---|---|---|
| 01010101010001010101010101010101 | 010101010100010101010101010101 | Memory1 |
| 11111111110000000011111111111111 | 111111111100000000111111111111 | Memory2 |
| 00000000000111011000000000000000 | 000000000001110110000000000000 | Memory2 |
| 10101010101110101010101010101010 | 101010101011101010101010101010 | Memory2 |

ABI

INTERCONNECT, BUS SYSTEM WITH INTERCONNECT AND BUS SYSTEM OPERATING METHOD

CROSS-REFERENCE TO RELATED APPLICATIONS

This U.S. non-provisional patent application claims priority under 35 U.S.C. §119 to Korean Patent Application No. 10-2010-0042071 filed May 4, 2010, the subject matter of which is hereby incorporated by reference.

BACKGROUND OF THE INVENTION

The present inventive concept relates to bus systems, interconnects, and operating methods for systems including a System On Chip (SOC).

SOCs are well known devices in which multiple integrated circuit chips (or chip blocks), potentially performing different functions, are commonly integrated onto a single substrate ("chip") or within a single semiconductor package. In order to satisfy the demands of a rapidly changing market, it is necessary to reduce the time required to design, develop and/or fabricate a SOC. One technique used to improve a new SOC's time to market essentially recycles existing chip blocks or chip IP cores. The recycling of an IP core is effective not only in reducing development time, but also improving the reliability of the new SOC.

On the other hand, efficient operation of a SOC requires a bus system that effectively interconnects the multiple chip blocks within the SOC. Unfortunately, the bus systems used in conventional SOCs are not readily adapted to the architectural changes inherent in a re-design of chip blocks, regardless of IP core recycling.

SUMMARY OF THE INVENTION

The inventive concept provides bus systems, such as the type that may be used in a SOC, that are capable of interconnecting and arbitrating bus use between multiple masters and/or slaves. The inventive concept also provides methods of operating a bus system that enable effective interconnection and bus arbitration between multiple masters and slaves.

Certain embodiments of the inventive concept provide a bus system that improves a response time for a master controlling multiple slaves.

Embodiments of the inventive concept provide a bus system comprising; masters respectively configured to access at least one slave via an interconnection, wherein the interconnect is configured to arbitrate between multiple request signals received from the masters, receive a master address from a requesting master selected from the masters, and enable access to the at least one slave by the requesting master in accordance with at least one selected bit identified from the master address.

Embodiments of the inventive concept provide an interconnect connecting a requesting master with two slaves, the interconnect comprising; an interleaving block that receives a master address from the requesting master and enables access to the two slaves in accordance with the master address, and a register that stores address bit information related to the master address, wherein the interleaving block refers to the address bit information and enables access to one of the slaves by the requesting master in accordance with at least one selected bit identified from bits of the master address by the address bit information.

Embodiments of the inventive concept provide an operating method for a bus system comprising a master, two slaves, and an interconnect connecting the master and the slaves, the method comprising; providing a master address from the master to the interconnect, selecting at least one bit of the master address within the interconnect with reference to address bit information stored in a register, converting a portion of the master address into a slave address, and enabling access to at least one of the slaves by the master in accordance with the slave address and the at least one bit of the master address.

Embodiments of the inventive concept provide a method of operating a bus system, comprising; receiving in an interconnect respective request signals from a plurality of masters, by operation of the interconnect, returning a grant signal to a requesting master selected from the plurality of masters, receiving from the requesting master a master address designating a plurality of slaves, identifying selection bits from the master address in accordance with stored address bit information, and using the selection bits, sequentially enabling access by the requesting master to the plurality of slaves.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, exemplary embodiments of the inventive concept will be described in some additional detail with reference to the accompanying drawings. It should be noted, however, that the inventive concept is not limited to only the illustrated embodiments, but may be variously embodied.

Figure 1:
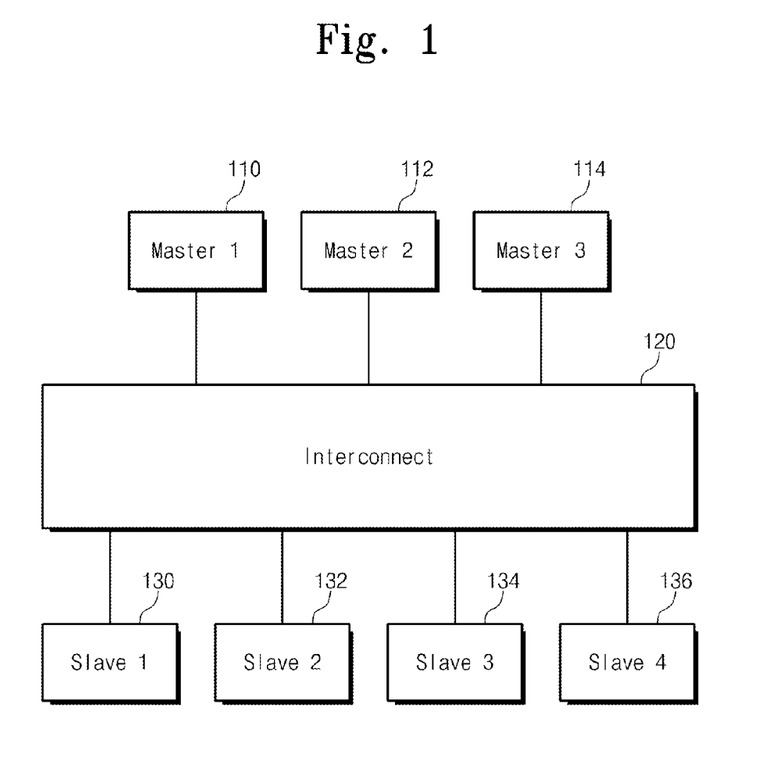
FIG. 1 is a block diagram illustrating a bus system according to an embodiment of the inventive concept.

FIG. 1 is a block diagram illustrating a bus system according to an embodiment of the inventive concept.

The bus system of FIG. 1 is shown with multiple (e.g., three) masters 110, 112 and 114 being connected to multiple (e.g., four) slaves 130, 132, 134 and 136, via an interconnect 120. Those skilled in the art will recognize that the illustrative choice of three masters 110, 112 and 114 and four slaves 130, 132, 134 and 136 is completely arbitrary. Embodiments of the inventive concept may include any reasonable number of master(s) and/or slave(s). Although not shown, an interface may be included between the masters 110, 112 and 114 and the interconnect 120, and between the slaves 130, 132, 134 and 136 and the interconnect 120, respectively. In the present embodiment, the particular circuitry connecting the masters 110, 112 and 114 and the slaves 130, 132, 134 and 136 is referred to as "an interconnect" 120, but might alternately be termed a backbone, bus, network, etc.

In the illustrated embodiment of FIG. 1, it is assumed that each master 110, 112 and 114 comprises a central processing unit (CPU), a microcontroller, a microprocessor, a digital signal processor (DSP), or similar logical control device. In certain embodiments where a bus system according to an embodiment of the inventive concept is incorporated into a mobile apparatus, each master may include an application chip, image processor, audio CODEC, modem, etc. Each master will provide a "request signal" when seeking access to one or more slaves via the interconnect 120. A "grant signal" is used to answer the request signal. Thus, when a grant signal is returned from the interconnect 120, the requesting master may determine that it has "ownership" (i.e., functional control over) of the bus system. Once ownership is established, the requesting master may transmit information to and/or receive information from an accessed slave. This information may take many different forms (e.g., payload data, ECC data, address data, control data, control signals, etc.), and may be defined in accordance with one of numerous conventionally understood data communication protocols.

For example, where the accessed slave is a semiconductor memory device, the requesting master may performed, read, write, and/or erase operations in relation to data stored in or to be stored in the access slave. It should be noted at this point, that the slaves 130, 132, 134 and 136 may be the same type or different type semiconductor memory devices.

In certain embodiments of the inventive concept, the interconnect 120 may serve as a arbiter, an information decoder, and/or a multi-layer bus. As arbiter, the interconnect 120 grants bus ownership to only one master at any given point in time during operation of the bus system. Coincidental request signals from multiple masters must be arbitrated by the interconnect 120 with one requesting master receiving a grant signal and the other masters receiving a denied signal. As decoder, the interconnect 120 decodes an address received from the requesting master that identifies a slave to be accessed. As a multi-layer bus (following arbitration and decoding), the interconnect 120 enables functional interconnection between the requesting master and accessed slave allowing an unidirectional or bidirectional exchange of information.

Thus, the interconnect 120 may receive as part of a request signal, or separate from the request signal, information such as address data and control data (e.g., a command instruction, burst operation instruction, data size definition, protocol definitions, ECC definitions, etc). In response to a request signal resulting in return of a grant signal, the interconnect 120 may communicate a data processing preparation signal to the accessed slave so that the data access circuitry of the accessed slave will be ready for instructions from the requesting master. In this manner, effective operation of the interconnect 120 may actually reduce the response time from an accessed slave with respect to an instruction received from the requesting master by performing a distributed access function in relation to the slaves in response to (e.g.,) the slave-identifying address information communicated from the requesting master.

Figure 2:
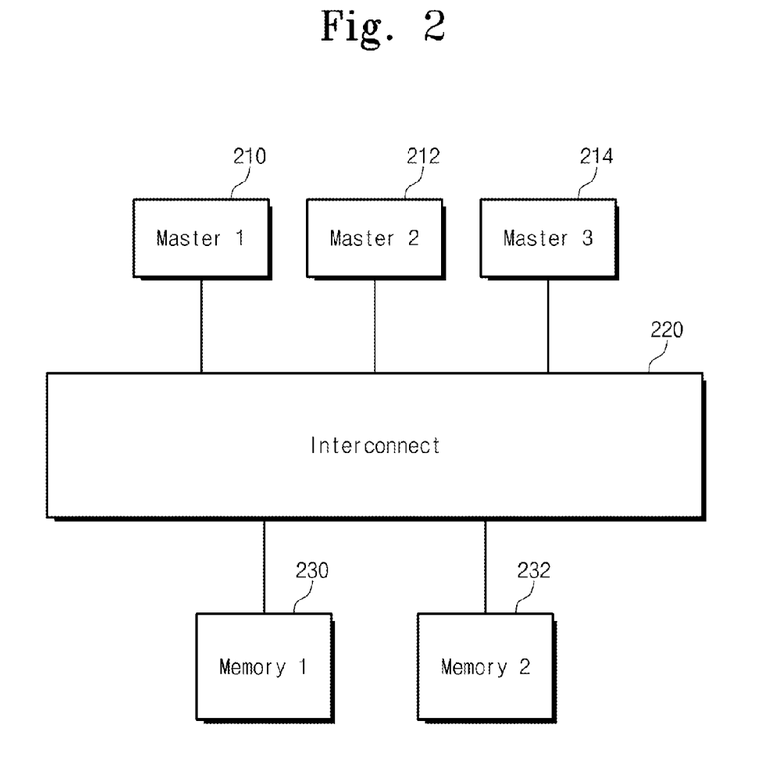
FIG. 2 is a block diagram illustrating a memory bus system according to an embodiment of the inventive concept.

FIG. 2 is a block diagram illustrating a memory bus system according to an embodiment of the inventive concept.

Referring to FIG. 2, the memory bus system comprises three masters 210, 212 and 214 connected to two memories 230 and 232 via an interconnect 220. The components shown in FIG. 2 may be otherwise assumed to similar to those generically described in relation to FIG. 1. However, the memories 230 and 232 may variously configured to include one or more memory core(s) including a memory cell array, a memory controller controlling data access to the memory core, etc.

In the illustrated embodiment of FIG. 2, each master 210, 212 and 214 may provide a request signal including an address identifying one or more of the memories 230 and 232 to the interconnect 220. The interconnect 220 may then control access to the one or more memories 230 and 232 in response to the request signal and the address.

Figure 3:
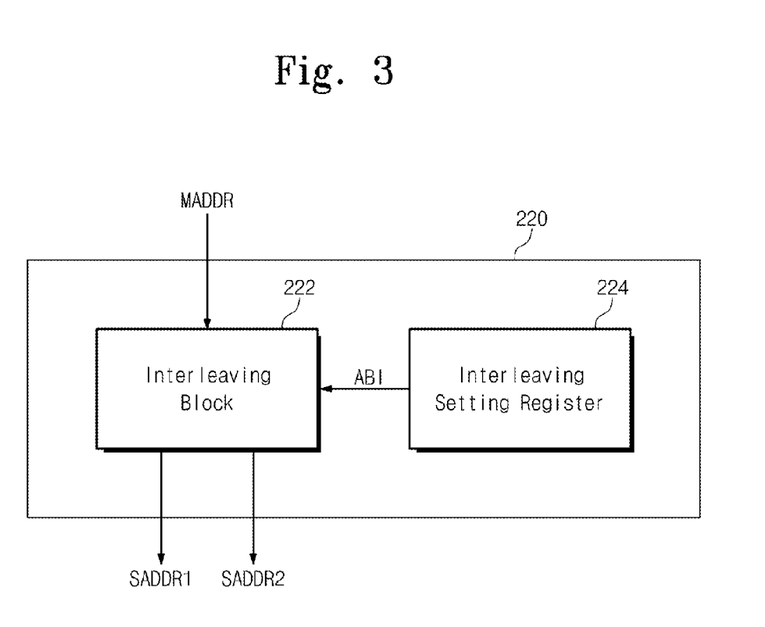
FIG. 3 is a diagram illustrating one possible configuration for the interconnect of FIG. 2.

FIG. 3 is a diagram illustrating one possible configuration of the interconnect 120 of FIG. 2.

Referring to FIG. 3, the interconnect 220 generally comprises an interleaving block 222 and interleaving setting register 224. Although only interleaving circuitry is shown for the interconnect 220 of FIG. 3, those skilled in the art will recognize that other conventionally understood circuits may be additionally incorporated to provide the bus arbitration, information decoding, and/or access control functions.

The interleaving setting register 224 may store address bit information ABI selecting a specific bit among bits of a master address MADDR provided by the requesting master. The interleaving block 222 may select one of the memories 230 and 232 shown in FIG. 2 according to the value of the specific bit of the master address MADDR in response to the address bit information ABI stored in the interleaving setting register 224, and may provide a slave address to be provided to the accessed memory. The address to be provided to the memory 230 may be a slave address SADDR1, and the address to be provided to the memory 232 may be a slave address SADDR2 in the illustrated embodiment. Thus, the interleaving block 222 will essentially convert the master address MADDR into slave address SADDR1 and/or slave address SADDR2 in accordance with the address bit information ABI.

Figure 4:
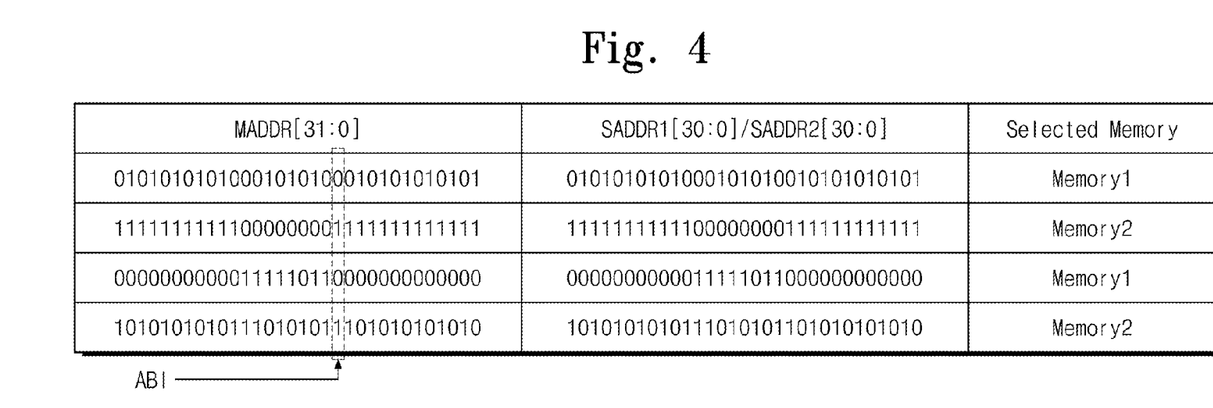
FIG. 4 is a table showing an exemplary master address and slave address and further explains the operation of the interleaving block of FIG. 3.

FIG. 4 is a table showing an exemplary master address and slave address and further explains the operation of an interleaving block shown in FIG. 3.

Referring to FIG. 4, it will be assumed that the master address MADDR [31:0] generated by the requesting master includes 32 bits, and the address bit information ABI designates the twelfth ($12^{th}$) bit of the master address MADDR, i.e., MADDR[12].

It is further assumed that the interleaving block 222 selects the first memory 230 when the twelfth bit MADDR[12] of the master address is 0, and selects the second memory 232 when the twelfth bit MADDRS[12] of the master address is 1. Accordingly, the interleaving block 222 provides a 31-bit address slave address (i.e., SADDR1 [30:0]) which is formed from the other (non-ABI-designated) bits of the master address MADDR [31:0], excepting the ABI-designated twelfth bit MADDR[12] to the corresponding first memory 230 or second memory 232.

Here, the address bit information ABI stored in the interleaving setting register 224 may be set according to the size of read data retrieved from or write data to be written to from the memories 230 and 232 by the requesting master. For example, when the requesting master uses write data and read data blocks of 4 KB in size, the address bit information ABI stored in the interleaving setting register 224 may be set to the twelfth bit of the master address MADDR.

According to one embodiment of the inventive concept, when a number of continuously performed data access operations are requested by a requesting master, the resulting sequence of read/write data blocks may be communicated in a distributed manner across multiple memories 230 and 232. By interleaving (e.g., odd/even) a sequence of data access operations across multiple memories, data throughput bandwidth for the memory system may be effectively increased. In particular, the requesting master may output a master address MADDR in consideration of the total available data access capacity of the constituent memories 230 and 232 without necessarily considering whether to access either one of the two memories 230 and 232. That is, the interconnect 220 may provide timely slave addresses SADDR1 and SADDR2 for each data access operation in accordance with the provided master address MADDR.

Although one possible embodiment of the inventive concept has been described in FIG. 4 assuming that the address bit information ABI set in the interleaving setting register 224 designates the twelfth address MADDR[12] of the master address MADDR, the address bit information ABI may be variously modified to reasonably designate any one or more of the constituent address bits of the master address MADDR according to the access data unit size of the requesting master and/or the available access data size provided from an access slave memory.

Alternately, certain master(s) (e.g., masters 210 and 212) may be configured to access the memories 230 and 232 according to one defined unit size (e.g., 4 KB), while other master(s) (e.g., master 214) may be configured to access the memories 230 and 232 according to a second defined unit size (e.g., 1 MB). In this type of arrangement, data access to/from the memories 230 and 232 by the first type masters 210 and 212 may generate a uniform (e.g., distributed) flow of data, while the second type master 214 may generate more transient flow of data, such as data flow to/from a specific memory.

Figure 5:
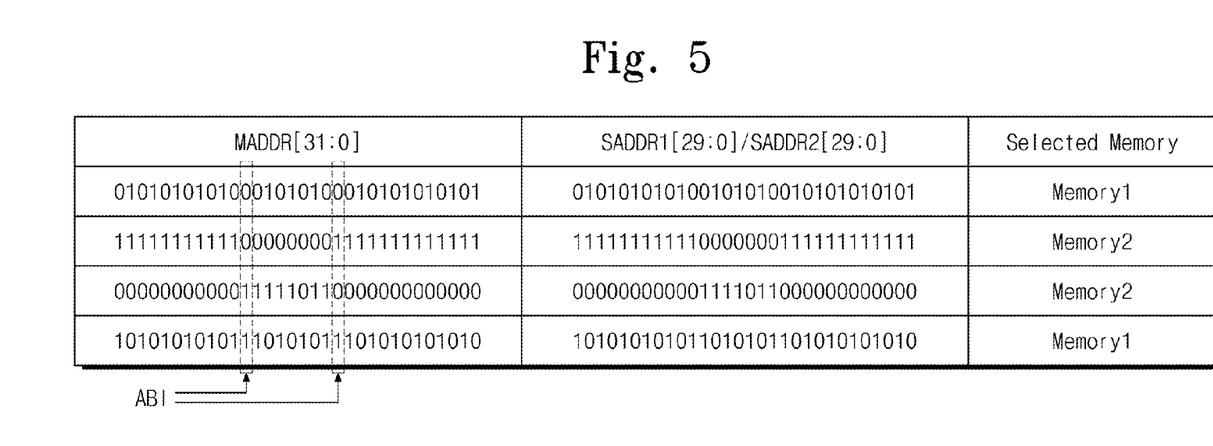
FIG. 5 is a table showing another exemplary master address and slave address and further explains the operation of the interleaving block of FIG. 3.

FIG. 5 is a table showing another exemplary master address and slave address and further explains the operation of the interleaving block of FIG. 3.

Referring to FIG. 5, it will again be assumed that the master address MADDR generated by a requesting master includes 32 bits. However, the address bit information ABI designates the twelfth ($12^{th}$) bit and the twentieth ($20^{th}$) bit of the master address MADDR, i.e., MADDR[12] and MADDR[20], respectively.

The interleaving block 222 shown in FIG. 3 may thus provide a slave address to any one of the memories 230 and 232 according to a defined logic operation performed on the twelfth bit MADDR[12] and the twentieth bit MADDR[20] of the master address. In the embodiment of the FIG. 5, the interleaving block 222 may select a memory to be accessed according to the results of an exclusive OR operation between the twelfth bit MADDR[12] and the twentieth bit MADDR [20] of the master address. For example, if the twelfth bit MADDR[12] and the twentieth bit MADDR[20] of the master address are 0 and 0, respectively, a slave address SADDR1[29:0] may be outputted to the memory 230. Also, if the twelfth bit MADDR[12] and the twentieth bit MADDR[20] of the master address are 0 and 1, respectively, a slave address SADDR2[29:0] may be outputted to the memory 232. In this case, the interleaving block 222 may combine address bits other than the twelfth bit MADDR[12] and the twentieth bit MADDR[20] of the master address to slave addresses ADDR1[29:0] and SADDR2[29:0].

In this case, even though certain first type masters 210 and 212 access the memories 230 and 232 according to a unit size of 4 KB, and a second type master 214 accesses the memories 230 and 232 according to a unit size of 1 MB, the cumulative access to the memories 230 and 232 may nonetheless be relatively uniform.

That is, respective access to the memories 230 and 232 may be adjusted by setting the address bit information ABI stored in the interleaving setting register 224 according to an access data size for designated types of masters 210, 212 and 214. Also, access designation to the memories may be controlled by a logic circuit associated with the interleaving block 222 that implements a functionality designed in accordance with certain access data size(s) between master(s) and memories connected via the interconnect 220.

When the data unit sizes for the memories 230 and 232 shown in FIG. 2 are the same, successive data requests from the masters 210, 212 and 214 may be controlled such that the memories 230 and 232 are sequentially accessed. However, when data unit sizes for the memories 230 and 232 are different, some type of memory selection circuitry or control functionality associated with the interleaving block 222 improves overall bus system performance.

Figure 6:
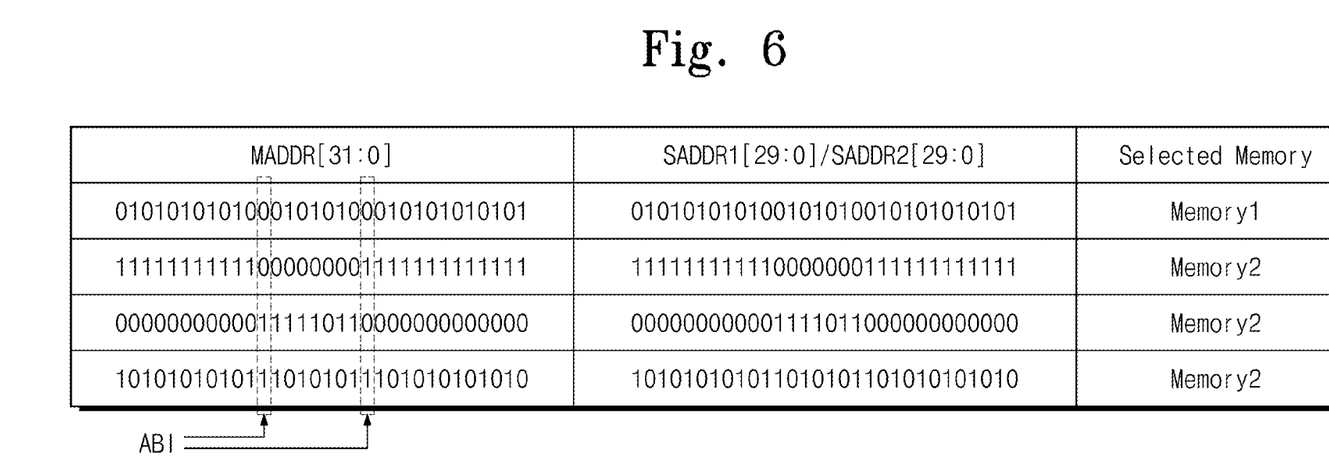
FIG. 6 is a table showing still another exemplary master address and slave address and further explains the operation of the interleaving block of FIG. 3.

FIG. 6 is a table showing still another exemplary master address and slave address and further explains the operation of the interleaving block shown in FIG. 3.

Referring to FIG. 6, it will again be assumed that the master address MADDR generated by a requesting master includes 32 bits, and the address bit information ABI designates the twelfth ($12^{th}$) bit and the twentieth ($20^{th}$) bit of the master address MADDR, i.e., MADDR[12] and MADDR[20], respectively.

The interleaving block 222 shown in FIG. 3 may output a slave address to any one of the memories 230 and 232 according to a logic operation result of the twelfth bit MADDR[12] and the twentieth bit MADDR[20] of the master address. In the embodiment of FIG. 6, when the twelfth bit MADDR[12] and the twentieth bit MADDR[20] of the master address are both 0, the interleaving block 222 may control the memory 230 to be selected. When at least one of the twelfth bit MADDR[12] and the twentieth bit MADDR[20] of the master address is 1, the memory 232 may be selected. As a result, the interleaving block may select the memories 230 and 232 at a ratio of about 1:3 according to the master address MADDR.

A method of generating a slave address in the interleaving block 222 as explained in relation to FIG. 6 may be suitable in the case where the memory 230 is about three times the size of the memory 232. The interleaving block 222 may be designed such that a selection ratio between the memories 230 and 232 is determined according to a corresponding size ratio between the memories 230 and 232.

Figure 7:
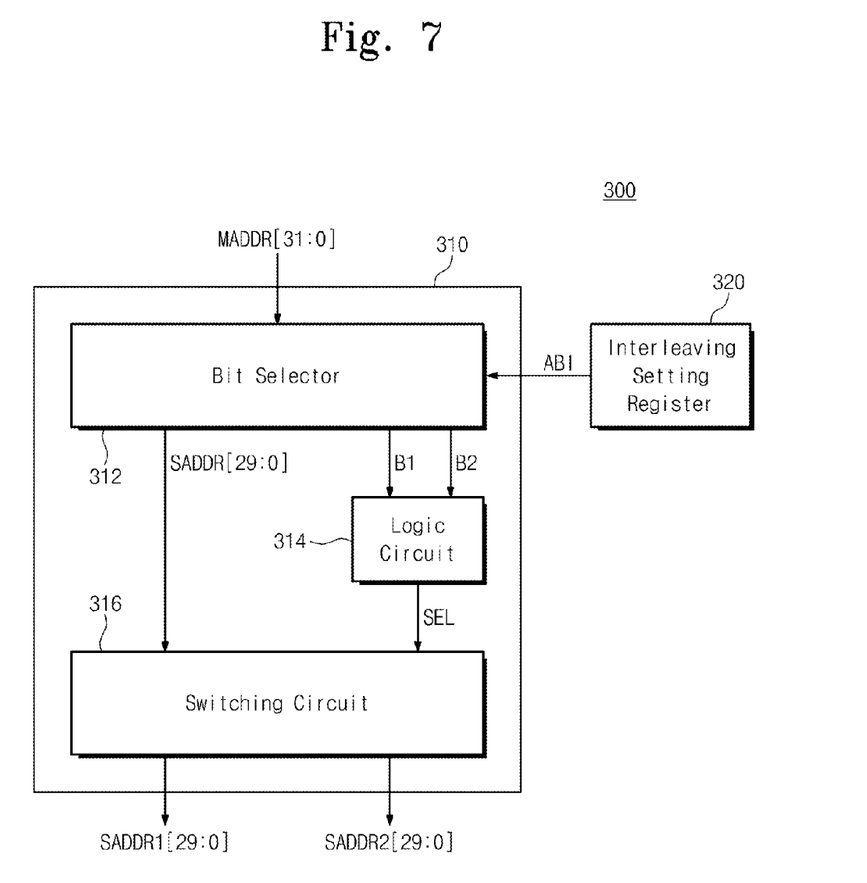
FIG. 7 is a block diagram illustrating another possible configuration for the interconnect of FIG. 2.

FIG. 7 is a block diagram illustrating another possible interconnect similar to the one shown in FIG. 2.

Referring to FIG. 7, an interconnect 300 generally comprises an interleaving block 310 and an interleaving setting register 320. The interleaving block 310 may include a bit selector 312, a logic circuit 314, and a switching circuit 316.

The interleaving setting register 320 may store address bit information ABI for selecting a specific bit among bits of a master address MADDR provided from a requesting master. The interleaving block 310 may select any one of the memories 230 and 232 shown in FIG. 2 according to the value of a specific bit(s) of the master address MADDR in response to the address bit information ABI stored in the interleaving setting register 320. Here again, it will be assumed that the address bit information ABI stored in the interleaving setting register 320 designates the twelfth ($12^{th}$) bit and the twentieth ($20^{th}$) bit of the master address MADDR[31:0].

The bit selector 312 in the interleaving block 310 may select the twelfth bit and the twentieth bit of the master address MADDR[31:0] in response to the address bit information ABI from the interleaving setting register 320, and may output the selected bits B1 and B2 to the logic circuit 314. The bit selector 312 may combine bits other than the twelfth bit and the twentieth bit of the master address MADDR[31:0] to output the slave address SADDR[29:0].

The logic circuit 314 may perform a logic operation with respect to the selected bits B1 and B2, and may output a selection signal SEL for selecting one of the memories 230 and 232. The switching circuit 316 may output the slave address SADDR[29:0] to one of the slave addresses to be provided to the slave address and the memory in response to the selection signal SEL.

Figure 8:
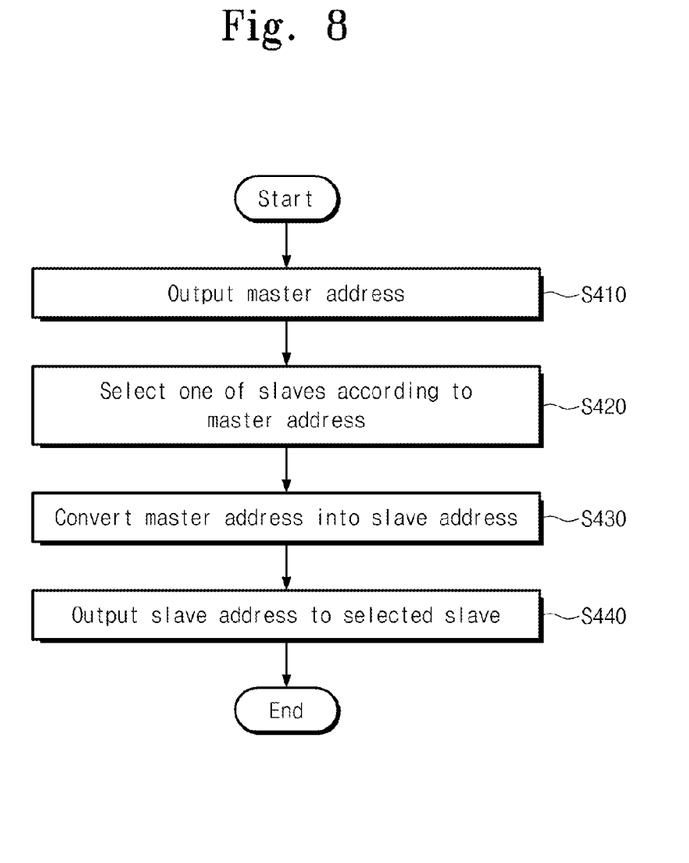
FIG. 8 is a flowchart summarizing an operating method for the bus system of FIG. 1 according to an embodiment of the inventive concept.

FIG. 8 is a flowchart summarizing a method of operating the bus system of FIG. 1 according to an embodiment of the inventive concept.

Referring to FIG. 8, a requesting masters (e.g., one of masters 110, 112 and 114 shown in FIG. 1) provides a request signal seeking access to at least one of slaves 130, 132, 134 and 136 via the interconnect 120. The requesting master, designated by a returned grant signal from the interconnect 120, has bus ownership and is able to provide (output) information including a master address with the one or more accessed slaves 130, 132, 134 and 136 (S410). A master address included within the communicated information may have a value greater than the sum of the addresses of the respective slaves 130, 132, 134 and 136. That is, the respective masters 110, 112 and 114 may provide a master address designating one, some or all the slaves 130, 132, 134 and 136 instead of designating only an individual address for a specific one of the slaves 130, 132, 134 and 136. The control signal transmitted from the master to the interconnect 120 may include commands such as read/write instructions with respect to the slaves 130, 132, 134 and 136, burst operation, data size, etc.

The interconnect 120 now selects one (e.g., a first one) of the slaves 130, 132, 134 and 136 in accordance with the master address (S420). For example, the interconnect 120 may select one of the slaves 130, 132, 134 and 136 according to a logic operation result with respect to one or more bits selected from the master address. These selected bits from the master address may be stored in the interleaving setting register.

The interconnect 120 now converts the master address into a slave address (S430). For example, the interconnect 120 may generate the slave address from non-selected bits of the master address. Them the interconnect 120 provides (outputs) the slave address to an accessed slave selected from the slaves 130, 132, 134 and 136 (S440).

In this manner, the interconnect 120 is able to enable/inhibit data access one or more specific slaves 130, 132, 134 and 136 using (e.g.,) a distributed-accessing method controlled in accordance with selected bits of the master address. As a result, circuit designers may design the inter-operation of respective masters 110, 112 and 114 in consideration of (potentially) different slaves (e.g., memories providing access to data using different data unit sizes) while still allowing distributed data access operations. Thus, the design of new SOCs may be facilitated at reduced cost—given the enhanced flexibility of data access afforded by bus systems designed in accordance with embodiments of the inventive concept. Further, since software developers may develop software without consideration of any given distributed access definition, costs associated with system bus development can be further reduced.

The above-disclosed subject matter is to be considered illustrative and not restrictive, and the appended claims are intended to cover all such modifications, enhancements, and other embodiments, which fall within the scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A system on chip comprising:
   masters respectively configured to access a slave, among at least first and second slaves, via an interconnect, wherein the interconnect is configured to arbitrate between multiple request signals received from the masters, receive a master address from a requesting master selected among the masters, and enable a data access operation directed to the slave by the requesting master in accordance with at least first and second bits of the master address, and
   the interconnect comprising:
      a register that stores address bit information specifying the first and second bits;
      a bit selector that selects the first and second bits in response to the address bit information;
      a logic circuit that logically combines bits including the first and second bits to generate a selection signal; and
      a switching circuit that in response to the selection signal converts a portion of the master address into one of a first slave address for the first slave and a second slave address for the second slave.

2. The system on chip of claim 1, wherein the portion of the master address converted into one of the first and second slave addresses includes bits of the master address other than the first and second bits of the master address.

3. The system on chip of claim 1, wherein each one of the first and second slaves is a semiconductor memory.

4. The system on chip of claim 1, wherein the address bit information is defined in accordance with at least one of a data unit size for the data identified by the data access operation and an available access data capacity at least one of the first and second slaves.

5. The system on chip of claim 4, wherein the first and second slaves have different data storage capacities; and
   the logic circuits combines the bits including the first and second bits to generate a selection signal in accordance with at least one of the different data storage capacities.

6. An interconnect connecting a requesting master with a selected slave among at least first and second slaves, the interconnect comprising:
   an interleaving block that receives a master address from the requesting master and enables a data access operation directed to the selected slave; and
   a register that stores address bit information specifying at least first and second bits of the master address,
   wherein the interleaving block comprises;
      a bit selector that selects at least the first and second bits in response to the address bit information;
      a logic circuit that logically combines bits including at least the first and second bits to generate a selection signal; and
      a switching circuit that in response to the selection signal converts a portion of the master address into one of a first slave address for the first slave and a second slave address for the second slave.

7. The interconnect of claim 6, wherein the portion of the master address converted into one of the first and second slave addresses includes bits of the master address other than the first and second bits of the master address.

8. An operating method for a system on chip comprising a plurality of masters including a requesting master, at least first and second slaves, and an interconnect connecting at least the requesting master and the first and second slaves, the method comprising:

providing a master address from the requesting master to the interconnect;

selecting at least first and second bits of the master address within the interconnect in response to the address bit information stored in a register;

logically combining at least the first and second bits to generate a selection signal;

converting a portion of the master address into one of a first slave address for the first slave and a second slave address for the second slave in response to the selection signal to selective enable access to one of the first and second slaves by the requesting master.

9. The operating method of claim 8, wherein the master address as a slave address enables access to both of the first and second slaves.

10. The operating method of claim 9, wherein for a sequence of continuous data access operations, different address bit information is stored in the register to enable alternating access to the first and second slaves.

11. The operating method of claim 9, wherein the portion of the master address converted into one of the first and second slave addresses includes bits of the master address other than the first and second bits of the master address.

12. A method of operating a system on chip, comprising:

receiving in an interconnect respective request signals from a plurality of masters;

by operation of the interconnect, returning a grant signal to a requesting master selected from the plurality of masters;

providing a master address from the requesting master to the interconnect;

selecting at least first and second bits of the master address within the interconnect in response to address bit information stored in a register;

logically combining bits including at least the first and second bits to generate a selection signal; and converting a portion of the master address into one of a first slave address for the first slave and a second slave address for the second slave in response to the selection signal to selectively enable a data access operation directed to one of the first and second slaves by the requesting master.

13. The method of claim 12, wherein for a sequence of continuous data access operations, different address bit information is stored in the register to enable alternating data access operations directed to the first and second slaves.

14. The method of claim 13, wherein the portion of the master address converted into one of the first and second slave addresses includes bits of the master address other than the first and second bits of the master address.

* * * * *